United States Patent [19]

Siegel et al.

[11] Patent Number: 5,563,927
[45] Date of Patent: Oct. 8, 1996

[54] METHOD OF RETARDING IRRADIATED NUCLEAR VESSEL CRACK INITIATION AND EXTENSIONS

[75] Inventors: Edward A. Siegel, W. Hartford; David J. Ayres, Canton Center; Scott A. Kendrick, Colchester; Pete Leombruni, Wethersfield; Frank J. Formanek, West Suffield; Kenneth V. Margotta, Ellington, all of Conn.

[73] Assignee: Combustion Engineering, Inc., Windsor, Conn.

[21] Appl. No.: 197,892

[22] Filed: Feb. 16, 1994

Related U.S. Application Data

[63] Continuation-in-part of Ser. No. 928,835, Aug. 10, 1992, abandoned.

[51] Int. Cl.[6] ................................................. G21C 13/00
[52] U.S. Cl. ........................... 376/294; 376/249; 220/592; 52/223.2
[58] Field of Search ..................................... 376/249, 277, 376/294, 296; 220/592, 648, 649; 52/223.2, 223.3, 249; 73/761, 785, 786, 813, 818; 29/446, 723, 897.34, 906

[56] References Cited

U.S. PATENT DOCUMENTS

| | | | |
|---|---|---|---|
| 2,629,354 | 2/1953 | Gay | 376/294 |
| 3,503,171 | 3/1970 | Frohly | 376/296 |
| 3,746,292 | 7/1973 | Anatalio | 376/294 |
| 3,793,878 | 2/1974 | Brunton | 73/785 |
| 4,093,100 | 6/1978 | Ford et al. | 220/592 |
| 4,192,718 | 3/1980 | Janakiev | 376/294 |
| 4,223,496 | 9/1980 | Mitterbacher et al. | 376/296 |
| 4,652,423 | 3/1987 | DeWitt et al. | 376/277 |
| 4,767,593 | 8/1988 | Wedellsborg | 376/294 |

FOREIGN PATENT DOCUMENTS

| | | |
|---|---|---|
| 314673 | 4/1974 | Austria . |
| 1547455 | 10/1968 | France . |
| 1542420 | 12/1969 | Germany . |
| 1639394 | 4/1971 | Germany . |

OTHER PUBLICATIONS

"A Guide To Nuclear Power Technology", John Wiley and Sons, Inc., New York, N.Y., Reprint Edition 1992, (Chapter 10, pp. 403–449).

Primary Examiner—Daniel D. Wasil
Attorney, Agent, or Firm—John H. Mulholland

[57] ABSTRACT

An irradiated steel pressurized nuclear reactor pressure vessel 10 is provided with a crack initiation retarding and crack extension retarding reactor vessel integrity girdle 20 or 120 made up of shoes or links 22, with mechanical take up joints (26 to 34a or 126 to 134a). Instead of pivoted shoe links 22, the girdle 120 may be made using constricting roller chain links 122. In any event, crack initiation and crack extension which may result from pressure loading or vessel material embrittled in the beltline region by neutron bombardment is retarded by maintenance of a prestress under the nozzles during all periods of operation of the reactor.

10 Claims, 2 Drawing Sheets

METHOD OF RETARDING IRRADIATED NUCLEAR VESSEL CRACK INITIATION AND EXTENSIONS

RELATED APPLICATION

This application is a continuation-in-part of U.S. application Ser. No. 07/928,835 filed Aug. 10, 1992 for METHOD FOR MECHANICAL PRESTRESS, now abandoned.

BACKGROUND OF THE INVENTION

Reactor vessels in Pressurized Water Reactors (PWRs) are required by law to be evaluated for a Pressurized Thermal Shock (PTS) event. The PTS event consists of a rapid cooldown and depressurization of the reactor vessel and a subsequent repressurization. The concern to be addressed is that integral steel (typically alloys are A501, A508 and A533) reactor vessels become embrittled in the beltline region due to neutron bombardment. See *A Guide to Nuclear Power Technology*,© 1984 John Wiley and Sons, Inc., New York, N.Y. (Chapter 10, pgs. 403–449) Reprint Edition 1992 by Kreiger Publ. Co., Malabar, Fla. 32950). As the vessel wall loses its ductility, a PTS event may initiate a crack or extend a pre-existing crack in the vessel wall. Some vessel materials, including weld joints, consist of certain chemical compositions that make them more susceptible to irradiation damage (embrittlement) than others. For these vessels, current evaluation methodologies may not demonstrate sufficient crack resistant behavior during a PTS event to satisfy regulatory requirements. If this occurs, the industry currently does not have an accepted, proven methodology to demonstrate vessel integrity. The Yankee Rowe nuclear plant shut down in 1992 due to these concerns. The suggested fixes for the Yankee Rowe steel vessel were deemed to be both too risky and too expensive to adopt.

All plants currently have a flux reduction program in place to reduce the rate of neutron embrittlement in the vessel. These programs include fuel management and local shielding efforts. The effect of these programs is to extend the operating life of the reactor vessel by postponing the time when the level of potential embrittlement reaches a regulatory screening level for PTS. Even with these flux reduction programs, however, some irradiated vessels will exceed the PTS screening criteria prior to the plant's operating life goals. As with the Yankee Rowe plant, this may result in a premature shutdown of an operating nuclear plant.

Once the PTS screening criteria is exceeded, there are two courses of action previously considered in the industry. The first is a complex probabilistic fracture mechanics and event three analysis whose goal is to demonstrate that the probability of unacceptable cracking in the vessel wall is below acceptance criteria. This analytical approach is not currently considered credible because of its complexity, inherent assumptions, and dependence on input data that is not readily or reliably available. Much of these uncertainties revolve about the actual material condition and properties at critical locations in the reactor vessel wall.

The second approach which has been considered is to anneal the irradiated reactor vessel in-situ to regain the material ductility lost to irradiation embrittlement. Annealing has not been performed on a commercial nuclear plant reactor vessel in the U.S.A. despite the teachings of U.S. Pat. No. 4,652,423, which are included herein by reference. Annealing has been performed in the Soviet Union, but those vessels are smaller, of different construction, and of different materials. Annealing is considered a high risk approach because it could result in permanent deformation or damage to a vessel which could end its useful life. The rate of re-embrittlement is also in question. In addition, the regulatory risk is high. The cost of an in-situ anneal has been estimated to be in the fifteen million United States Dollars ($15M USD) to twenty-five million United States Dollars ($25M USD) range and may be cost prohibitive for many plants even if the technical and regulatory risks are overcome.

The concept of mechanical prestress has been applied to other situations in the past. Cable wraps about cannon barrels were used on British warships to prevent blowing apart cannons when the forged or cast barrels were of poor quality. In Boiling Water Reactors (BWRs), stress corrosion cracking of stainless steel piping has been retarded by utilizing a weld overlay technique or clamping band that applies a compressive load to the piping as the weld overlay cools and shrinks. As explained in U.S. Pat. No. 3,742,985, these prior art methods can be likened to the same thing as occurs to a wooden wheel when a blacksmith "sweats-on" a steel or iron rim and the wheel becomes tightened as shrinkage of the cooling iron or steel occurs.

SUMMARY OF THE INVENTION

The mechanical prestress of the invention for minimizing PTS damage is embodied in a belly band or girdle-like apparatus called a "girdle" that encircles and radially constricts the reactor vessel in the beltline region. The girdle is fabricated from links, segmented plate sections, cables, or coils, for example. It is preferably of a steel material which is the same or substantially the same as the steel material of the vessel. The girdle design must be installable in-situ while the plant is at or near ambient temperature and pressure conditions. Accordingly, mechanical joints such as threaded bolt, clevis and bracket joints, typically, may be used in the fabrication with or separately from welded joints, which also may be utilized. Bellville spring washers are preferably utilized in combination with a threaded bracket to bias and prestress the vessel.

The purpose of the girdle is to impart to the irradiated vessel sufficient compressive load to significantly retard crack initiation and/or crack extension during all operating modes, including a PTS event. The use of this girdle may also permit a simple analysis and possibly a deterministic analysis to be utilized to demonstrate vessel integrity. The girdle, together with the more simple analysis, will offer an improvement as compared to the complex analyses being currently considered for use. The evaluation of the effects of the compressive loadings are straightforward, understandable, and low risk vs the current alternatives described above.

Once the girdle is installed at ambient conditions, it must remain intact during each definable period of the entire operating cycle. This cycle includes vessel expansion during the periods of heat-up (thermal growth) and pressurization (pressure growth). At operating temperature and pressure, both the girdle and the vessel must be at an acceptable stress state. The girdle must maintain a sufficient minimum preload also during the periods of plant cooldown (thermal contraction) and depressurization (pressure contraction). During a PTS event, the vessel will repressurize. At this point, the girdle must apply sufficient preload to significantly retard crack initiation and extension.

In addition, the ability to verify, on-line, that the required preload is maintained preferably is incorporated into the girdle. This can be accomplished, for example, with built-in, pre-calibrated conventional strain gages which can be monitored on-line. In this regard it is believed that an eyebolt used in the joint of the girdle fabrication for cinching could be in the form of a "SMARTSTEM" calibrated transducer for load sensing sold by Teledyne Engineering Services, 130 Second Avenue, Waltham, Mass. 02254-9195. See also load sensing in U.S. Pat. No. 3,793,878.

The key design feature, then, is the balancing of the load in the girdle with the required preload imparted to the vessel. The girdle must not be overstressed and must remain in the elastic behavior regime or "elastic strain range or area" (as illustrated in FIG. 10.1(b) pg. 404 of *A Guide to Nuclear Power Technology*, supra). The load imparted to the vessel must be sufficient to reduce the tensile stresses significantly. Accordingly, the prestress values are chosen such that the girdle and vessel satisfy all codes' and standards' stress limits as contained in the American Society of Mechanical Engineers (ASME) Section III and the 10 Code of Federal Regulations Section 50 (10 CFR 50) requirements, and remain in the elastic behavior regime during all loading cycles and periods.

The method of designing and providing a preloaded radial compression girdle for an irradiated integral steel pressurized nuclear reactor vessel to retard crack initiation and to retard crack extension in said vessel includes the steps to follow.

The overall radial growth and shrinkage of the vessel to be provided with the girdle is determined: during the vessel's normal heat-up period, during the vessel's steady state operation period and during a hypothetical pressurized thermal shock event of the vessel which includes during a rapid cooldown and depressurization period of the vessel and during a repressurization period of the vessel.

A suitable metal radial compression girdle is chosen of a material, which is preferably the same material as that of the vessel, with sufficient strength and elasticity to maintain a prestress radial load on said vessel during each of said periods and during said event. The girdle is applied and preloaded such that it remains at all times in intimate and positive radial contact and position on the outer surface of the irradiated vessel intermediate its ends. The girdle material has sufficient strength and elasticity to maintain the intimate contact. However, a bellville spring packed joint mechanism may be utilized and torqued up to provide or aid in providing the proper circumferential tension and prestress.

The invention's advantages include the method of provision of the girdle, the in-situ installation technique and tooling, the on-line monitoring, and a credible vessel analysis to address crack initiation/extension issues during a PTS event.

This is all being achieved with well recognized proven materials and techniques. New unproven technical approaches are purposely avoided to minimize the technical and regulatory risks and associated costs.

DETAILED DESCRIPTION OF THE ILLUSTRATED EMBODIMENTS

Figure 1:
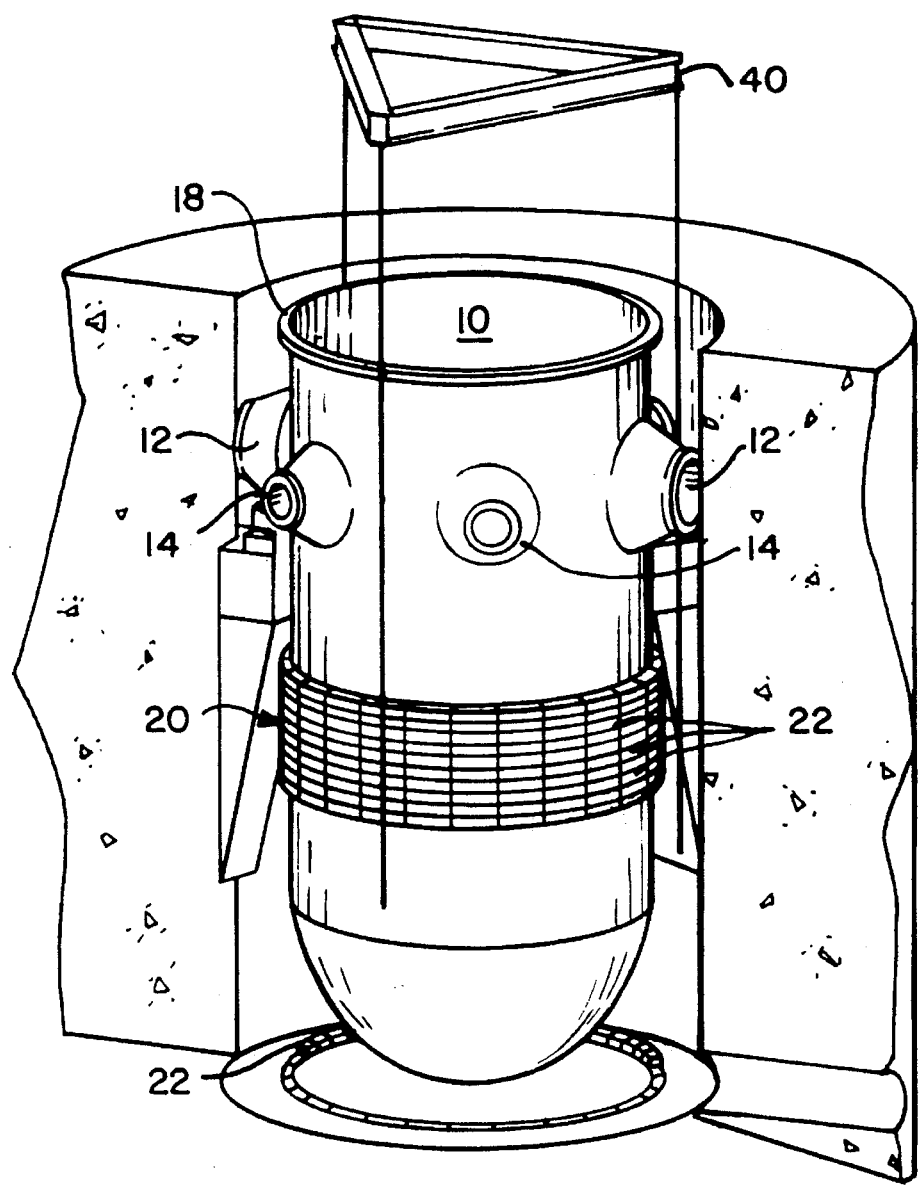
FIG. 1 is schematic perspective view of an irradiated steel pressurized nuclear reactor vessel with a reactor vessel integrity girdle partially in place, which has been fabricated to include links which compress the reactor vessel to retard crack initiation and crack extension which may result from pressure loading of the vessel material embrittled in the beltline region by neutron bombardment.
Figure 2:
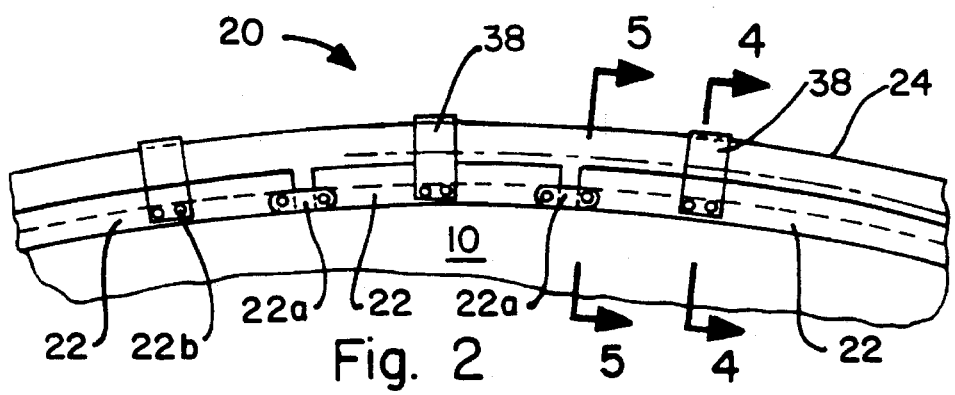
FIG. 2 is a fragmentary horizontal cross-sectional view of the vessel of FIG. 1 with details of the girdle cable and shoes or links shown.

The numeral 10 generally designates a schematic view of a typical steel pressurized nuclear reactor vessel. The reactor vessel 10 includes outlet flow nozzles 12 and inlet flow nozzles 14. An annular flange 18 acts as a seat for an upper closure head (not shown).

The integrated reactor vessel integrity girdle of the invention is generally designated by the numeral 20 in the various embodiments of the invention as illustrated in the drawings.

The girdle is partially but substantially finished in FIG. 1 and is made of links or shoes 22 pivotally connected together around the circumference of vessel 10 intermediate its ends and below the nozzles 12 and 14. Links 22 are assembled and positioned for installation on the floor of the reactor cavity and cinched into proper position by cable 24 at ambient temperature to provide the proper prestress as discussed above.

Figure 3:
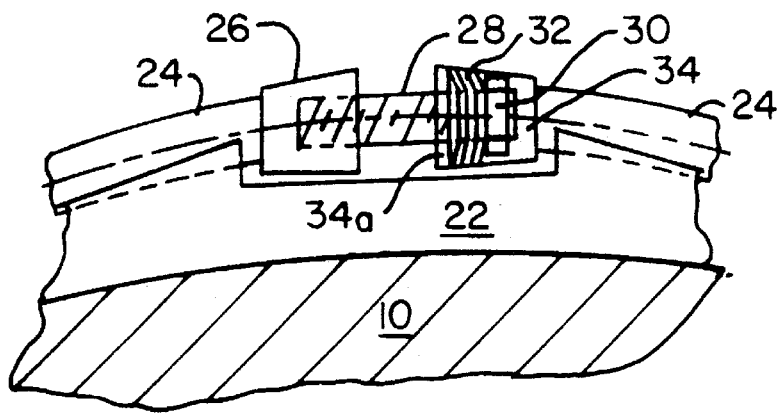
FIG. 3 is a fragmentary view similar to FIG. 2 showing the threaded girdle connection joint special show and bellville washer spring pack.

The girdle joint or connection for cable 24 is shown in FIG. 3 and includes threaded socket member 26, threaded stud member 28 and nut 30 which is torqued against a pack 32 of bellville washer springs in engagement with a flange 34a of a bracket an end connector 34 attached to cinching cable 24.

The girdle 20 being of the same material or substantially the same material as the vessel has an elastic behavior regime which is substantially the same as the vessel. With the torquing of nut 30, the proper prestress for all the periods of operation of the reactor is thus easily provided.

Figure 4:
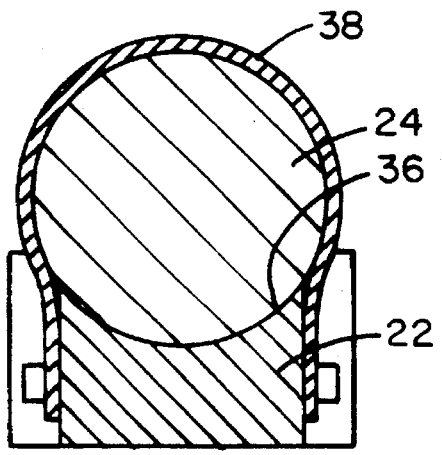
FIG. 4 is a fragmentary cross-sectional view taken along the line 4—4 of FIG. 2.

The cable 24 holds shoes 22 in position as shown in FIG. 1 because of a seating groove 36 in shoes 22. As seen in FIG. 4 clamps 38 hold the cable 24 in place.

Figure 5:
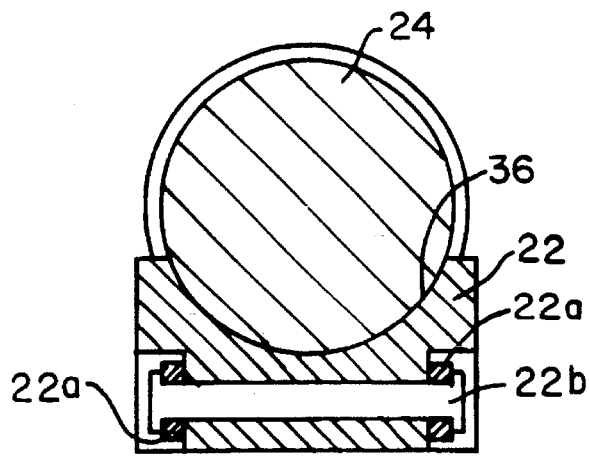
FIG. 5 is a fragmentary cross-sectional view taken along the line 5—5 of FIG. 2.

The pivotal connection provided between the shoes or links 22 are provided by short links 22a pinned by headed pivot pins 22b through openings adjacent each end of a shoe 22, as best seen in FIG. 5.

An alternative girdle 120 is made up of roller chain links 122 of the same material or substantially the same material as the vessel 10. A connecting link with elements 126 and 134 joined by a threaded stud 128 is provided. Biasing is provided by means of a pack of bellville spring washers 132 which reacts against a flange 134a when nut 130 is torqued to the proper prestress of vessel 10.

Figure 6:
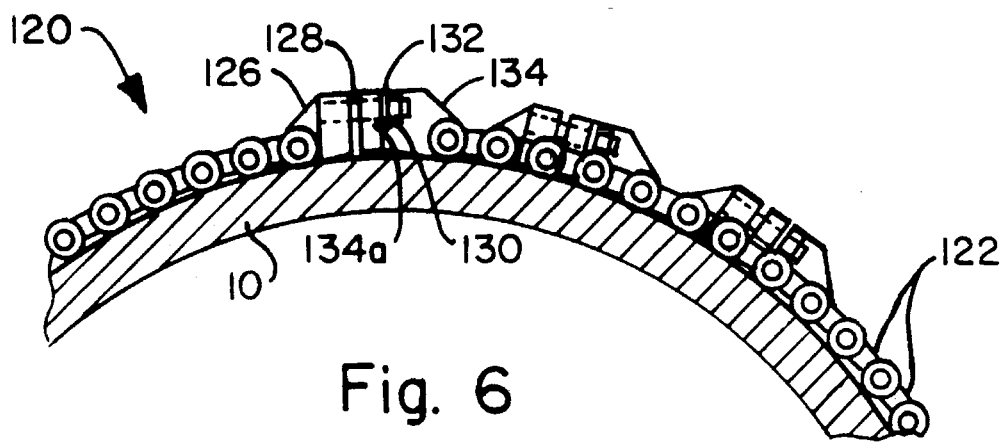
FIG. 6 is an alternative girdle view similar to FIGS. 2 and 3 showing roller links and a threaded girdle connection joint and bellville washer spring pack.

Whether the prestressing is accomplished with the hardware of girdle 20 or of girdle 120, the joints of the individual girdles are assembled on the floor of the reactor cavity and lifted by means of an overhead lift rig 40 which accesses through a gap formed by removal of the reactor pool seal. Preferably, a plurality of individual girdles are lifted into "stacked" position under nozzles 12 and 14 before being torqued to the proper prestress of vessel 10 in what may be termed a "bellyband." The joints are preferably staggered as shown in FIG. 6 to facilitate stacking and torquing of nuts 30.

Accordingly, it can be seen that the novel method of prestressing an irradiated vessel by means of girdle 20 and 120 of the invention provides a simple means of embrittled vessel retardation of crack initiation and crack extension which is passive and in American Society of Mechanical Engineers (ASME) code compliance, and, which when compared to the alternative of annealing, provides low technical risk, low regulatory risk and low vessel damage risk.

We claim:

1. A method of providing a preloaded radial compression girdle for an integral steel nuclear pressurized water reactor pressure vessel which has been irradiated during use to retard crack initiation and to retard crack extension in said vessel which comprises the combination of steps of:

determining the overall radial growth and shrinkage of said vessel which occurs or will occur during the vessel's normal heat-up period, during the vessel's steady state operation period and during a hypothetical pressurized thermal shock event of the vessel which includes during a rapid cooldown and depressurization period of the vessel and during a repressurization period of the vessel;

then applying and preloading a metal radial compression girdle to maintain a positive prestress radial load on said vessel during each of said periods and during said event in intimate and positive radial contact with the outer vessel surface to maintain radial compression thereon during each of said periods, and during occurrence of any such event, to retard crack initiation and to retard crack extension in said vessel.

2. The method of claim 1 in which the step of determining is performed in-situ in an existing operating nuclear plant on an irradiated vessel.

3. The method of claim 1 in which the step of applying and preloading includes the step of tensioning a constricting girdle circumferentially about said vessel intermediate its upper and lower ends in-situ in an existing operating plant on an irradiated vessel.

4. The method of claim 1 in which the step of applying and preloading includes the torquing of threaded cinching joint means of the girdle.

5. The method of claim 1 in which the step of applying and preloading includes a step of positioning a preassembled constricting girdle below the vessel nozzles and lifting the girdle vertically into position.

6. The method of claim 1 in which the step of applying and preloading includes the steps of choosing a material of sufficient strength and elasticity to maintain a positive prestress radial load on said irradiated vessel during each of said periods and during said event.

7. The method of claim 1 in which the step of applying and preloading includes the step of prestressing such that the girdle and irradiated vessel remain in the elastic behavior regime during all said periods.

8. The method of claim 7 in which the girdle material is substantially the same steel material as the steel material of the vessel.

9. A method of providing a preloaded radial compression girdle for an integral steel nuclear pressurized water reactor pressure vessel to retard crack initiation and to retard crack extension in said vessel which comprises the combination of steps of:

determining in-situ in an existing operating nuclear plant on an irradiated vessel the overall radial growth and shrinkage of said vessel during the vessel's normal heat-up period, during the vessel's steady state operation period and during a hypothetical pressurized thermal shock event of the vessel which includes during a rapid cooldown and depressurization period of the vessel and during a repressurization period of the vessel;

applying and preloading a metal radial compression girdle to maintain a positive prestress radial load on said vessel during each of said periods and during said event in intimate and positive radial contact with the outer vessel surface to maintain radial compression thereon during each of said periods, and during occurrence of any such event, to retard crack initiation and to retard crack extension in said vessel.

10. The method of claim 9 in which the step of applying and preloading includes the step of tensioning a constricting girdle circumferentially about said vessel intermediate its upper and lower ends in-situ in an existing operating plant on an irradiated vessel.

* * * * *